3,061,563
AQUEOUS SHELLAC ACRYLONITRILE ACRYLIC ACID ESTER, WITH OR WITHOUT ALDEHYDE CONDENSATION PRODUCTS AND SUBSTRATES COATED THEREWITH

Richard E. Zdanowski and Walter W. Toy, Philadelphia, Pa., Bjorn E. Larsson, Moorestown, N.J., and Benjamin B. Kine, Levittown, Pa., assignors to Rohm & Haas Company, Philadelphia, Pa., a corporation of Delaware
No Drawing. Filed Mar. 18, 1959, Ser. No. 800,104
23 Claims. (Cl. 260—25)

This invention relates to aqueous coating compositions, particularly to aqueous dispersed acrylic/shellac interpolymer coatings, more particularly to metallic and non-metallic substrates coated with the aqueous dispersions, and still more particularly to electrical wires coated with the aqueous dispersions, and process of making them.

Many varieties of prior art coating compositions have been used as insulation on magnet wire to be used in the manufacture of core wound electrical devices such as armatures, electromagnets, relays, coils, and the like. The coatings are generally deposited from a solution of the film-forming components in volatile organic solvents.

The solution type wire coatings have the disadvantage of the presence of volatile organic solvents, which are sometimes noxious, and are costly vehicles. Solvent recovery systems to salvage the volatile solvents allay the cost in part. Another disadvantage is that the viscosity of the coating varies significantly with the amount of dissolved film former and application characteristics necessitate applying the coating at low solids with many coats. For example, six or more coats are often required to deposit a 1 mil film on wire.

The aqueous dispersion coatings of this invention avoid the disadvantages of the solution type coating composition by use of water as the predominating component of the volatile vehicle and permit the use of higher molecular weight polymers than is possible with organic solutions of the polymer.

Suitable compositions for coating of magnet wire, in addition to having the necessary electrical properties, must be flexible, tough, hard, abrasion resistant, resistant to heat shock and heat ageing, solvent resistant, and must be applicable at conventional coating speeds such as 10 to 40 feet per minute without the need for abnormal baking temperatures. Resistance to fluorinated organic compounds is particularly important for the coatings of the armature or field winding wire in magnetic motors used in refrigerators wherein they are exposed to the refrigerant liquid, such as Freon.

The primary object of this invention is the provision of an improved coating composition dispersed in an aqueous medium. A further object is to provide coatings having desirable electrical insulating properties. A still further object is the provision of a wire enamel composition which, when applied to a wire and cured, results in a coalesced, flexible, tough, hard, abrasion resistant, heat resistant and solvent resistant coating which is characterized by a high degree of adhesion. These and other important objects and advantages will become readily apparent as the description of the invention proceeds.

These objects are accomplished by the preparation and application of an aqueous dispersion of an acrylic/shellac copolymer. The shellac copolymers of the present invention are those formed of a mixture of 5 to 15% by weight of shellac, 50 to 80% by weight of acrylonitrile, and 15 to 45% by weight of an ester of acrylic acid with an alcohol having from 1 to 18 carbon atoms, preferably an alkanol having from 1 to 4 carbon atoms, e.g., methanol, ethanol, n-propanol, isopropanol, and n-butanol. Part or all of the acrylonitrile may be substituted by methacrylonitrile. The compolymer is applied to a suitable substrate and preferably heated to coalesce and/or cure the coating.

Besides the essentially non-functional monomers just recited, there may be included within the copolymer up to 10% by weight of various reactive monomers including acrylamide, methacrylamide, the salts of acrylic acid, methacrylic acid, itaconic acid, maleic acid, fumaric acid, citraconic acid, aconitic acid, and the dimer of methacrylic acid with ammonia, an alkali-metal, such as sodium, potassium, or lithium, or a volatile water-soluble amine such as dimethylamine or triethylamine, and various other monomers falling within the definitions of Formulas I, II, III, and IV, as follows:

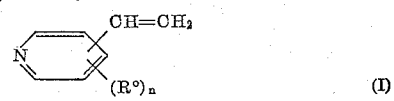
(I)

where:

R° is selected from the group consisting of H and alkyl groups having 1 to 4 carbon atoms, and
n is an integer having a value of 1 to 4, $$CH_2=C(R)AYNR^1R^2 \quad (II)$$

where:

R is selected from the group consisting of H and $CH_3$,
A is selected from the group consisting of O, S,

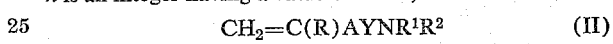

Y is an alkylene group having 2 to 4 carbon atoms,
$R^1$ is selected from the group consisting of H and an alkyl group having 1 to 4 carbon atoms, and
$R^2$ is selected from the group consisting of H and an alkyl group having 1 to 4 carbon atoms,

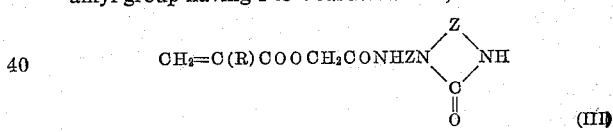
(III)

where:

R is the same as above, and
Z is an alkylene group having 2 to 3 carbon atoms.

Examples of compounds of Formula I include: 2-vinylpyridine; 3-vinylpyridine; 4-vinylpyridine; 2-methyl-5-vinylpyridine; 5-methyl-2-vinylpyridine; 4-methyl-2-vinylpyridine; 2-ethyl-5-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine.

Examples of compounds of Formula II include:

Dimethylaminoethyl acrylate and methacrylate
Diethylaminoethyl acrylate and methacrylate
Dimethylaminopropyl acrylate and methacrylate
Diethylaminopropyl acrylate and methacrylate
Dipropylaminoethyl acrylate and methacrylate
Di-n-butylaminoethyl acrylate and methacrylate
Di-sec-butylaminoethyl acrylate and methacrylate
Di-t-butylaminoethyl acrylate and methacrylate
Dimethylaminoethyl vinyl ether and sulfide
Diethylaminoethyl vinyl ether and sulfide
Aminoethyl vinyl ether and sulfide
Monomethylaminoethyl vinyl ether and sulfide
N,N-dimethylaminoethyl acrylamide and methacrylamide
N,N-diethylaminoethyl acrylamide and methacrylamide Examples of compounds of Formula III include:

N-[β-(α-methacryloxyacetamido)ethyl] - N,N - ethyleneurea
N-[β-(α-acryloxyacetamido)ethyl]-N,N'-ethyleneurea N-[β-(α-acryloxyacetamido)ethyl]-N,N'-trimethyleneurea N-[β-(α-methacryloxyacetamido)ethyl]-N,N'-trimethyleneurea

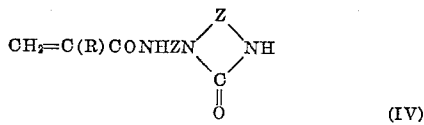

(IV)

where R and Z are as defined above, of which an example is N-[β-(methacrylamido)ethyl]-N,N'-ethyleneurea.

In preparing the copolymers, the shellac may be mixed into the water which is then made alkaline such as by the addition of ammonium hydroxide, triethylamine, morpholine, triethanolamine, or borax. Generally, about 18 to 22 parts by weight of concentrated ammonium hydroxide (28%) is needed to dissolve 100 parts by weight of shellac. The solution is generally aided by heating the aqueous ammonia to a temperature of 40° to 60° C. After the shellac is dissolved in the alkaline solution, it is generally preferred to cool the solution before adding the acrylic monomers. The cooling may lower the temperature to about 15° to 25° C. The monomers are added with stirring and then the initiator or catalyst for polymerization is added.

As polymerization catalyst there may be used one or more peroxides which are known to act as free-radical catalysts and which have solubility in aqueous solutions of the emulsifier. Highly convenient are the persulfates, including ammonium, sodium and potassium persulfates or hydrogen peroxide or the perborates or percarbonates, but it is generally preferable to avoid the use of such inorganic salts since the presence of residual ionizable material of this type tends to reduce the water-resistance and adhesion of the cured coating to metal substrates. Hence, it is preferred to use an organic peroxide as the initiator. Typical organic peroxides include benzoyl peroxide, tert-butyl hydroperoxide, cumene peroxide, tetralin peroxide, acetyl peroxide, caproyl peroxide, tert-butyl tert-butyl perbenzoate, tert-butyl diperphthalate, methyl ethyl ketone peroxide, etc.

The amount of peroxidic catalyst required is roughly proportional to the concentration of the mixture of monomers. The usual range is 0.01% to 3% of catalyst with reference to the weight of the monomer mixture. The preferred range is from 0.05% to 0.5%, while the range of 0.1% to 0.25% is usually best.

In order to effect interpolymerization at a temperature below that at which coagulation might occur, it is desirable to activate the catalyst. This may best be accomplish by using a so-called redox system in which a reducing agent is present in addition to the peroxidic catalyst. Many examples of such systems are known. Agents such as hydrazine or a soluble sulfite, including hydrosulfites, sulfoxalates, thiosulfates, sulfites, and bisulfites can be used. Examples of these are sodium hydrosulfite, sodium metabisulfite, potassium sulfite, zinc formaldehyde-sulfoxalate, and calcium bisulfite. Redox systems may be activated by the presence of a small amount of polyvalent metal ions. Ferrous ions are commonly and effectively thus used, a few parts per million being sufficient. The peroxide catalyst may also be activated by the presence of a tertiary amine which is soluble in the reaction medium, such as dimethylethanolamine or triethanolamine and polyamines such as diethylenetriamine, triethylenetetramine, and tetraethylenepentamine.

The amounts of reducing agent or amine required vary somewhat with the choices of peroxide initiator, reducing activator or agents, and metal promotor, if used, also with the choice of emulsifying agent, and with the particular monomers involved. Yet within the limits of about 0.05% to 6% with reference to the weight of the mixture of monomers will be found the amount of reducing agent for practically any system. The preferred amounts of reducing agent or equivalent fall in the range of 0.2% to 1%.

Copolymerization is best effected below about 80° C. A preferred range is 15° to 70° C., although slightly lower and somewhat higher temperatures are permissible. After most of the monomers have been converted to interpolymer, temperatures even higher than 80° C. may then be applied. In fact after most of the monomers have interpolymerized, the resulting dispersion can be heated to boiling without breaking the dispersion. During interpolymerization the temperature can be controlled in part through the rate at which monomers are supplied and interpolymerized and/or through applied cooling.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomer or monomers as polymerization proceeds. An advantage of gradual addition of monomers lies in reaching a high solids content with optimum control and with maximum uniformity of product. Additional catalyst or additional components of the redox system may also be added as polymerization proceeds.

In the process of polymerization here described an aqueous emulsion of a mixture of the defined polymerizable monomers is stirred and treated with a redox system starting between about 10° C. and about 40° C. About 0.01% to 1% of a peroxidic catalyst based on the weight of the monomers used is usually an effective amount at the start and the required amount of reducing substance, hydrosulfite, sulfite metabisulfite, or the equivalent for this system, may be of the same order or somewhat more by weight. When interpolymerization starts, the temperature of the mixture rises, usually rather rapidly. Care is taken to keep the temperature of the mixture below the levels at which coagulation might occur.

Amounts of monomers are supplied to bring the content of dispersed interpolymer to 25% to 60% of the total dispersion, preferably to 45% to 55%. Interpolymerization or copolymerization should be carried on until no more than a few percent of monomers remain in the mixture. When these monomers are volatile, they can be reduced or removed by steam distillation or stripping under reduced pressure, if so desired.

With the attainment of desired interpolymer content in good yield, with or without removal of residual monomers, the dispersion is cooled, cooling to a range of 50° to 20° C. being generally satisfactory.

It is generally unnecessary to add a dispersing agent to the system. It appears that a small portion of the shellac tends to serve to disperse the monomers and also the copolymer obtained. However, if desired, a non-ionic or anionic surface-active agent or a mixture thereof may be introduced into the system to aid in the emulsification of the monomers or the stabilization or dispersion of the polymer system obtained. Typical non-ionic emulsifiers which may be used include alkylphenoxypolyethoxyethanols having alkyl groups of about seven to twelve carbon atoms, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene-linked alkyl phenols; sulfur-containing agents such as those made by condensing the required proportion of ethylene oxide with nonyl, dodecyl, tetradecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil; ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, etc. Suitable anionic dispersing agents include the sodium salts of the higher fatty acid sulfates, such as that of lauryl alcohol, the higher fatty acid salts, such as the oleates or stearates of morpholine, triethanolamine or mixed ethanolamines.

For the coating purposes of the present invention, the aqueous dispersion or colloidal solution of the shellac copolymer that is obtained by copolymerization may be applied as such or it may be mixed with a thermosetting resin-forming condensate before application. Before mixing the aqueous dispersion with the thermosetting resin, residual monomer may be removed and/or the copolymer dispersion may be diluted. The aqueous dispersions may be diluted to concentrations as low as 1% before mixing. For most purposes, concentrations of 10 to 40% in the aqueous dispersions are used, but in preparing the compositions for coating metals including wire, the concentration may be as high as 45%.

The thermosetting resin-forming precondensates that may be used include the water-soluble condensates of formaldehyde with phenol, urea, thiourea, N,N'-ethyleneurea, aminotriazines such as melamine, benzoguanamine, and acetoguanamine, as well as alkylated formaldehyde condensates with the various compounds just named in which the alkylation is effected with methanol or in some cases ethanol so that the condensate is still water-soluble or easily dispersible in water. A small amount of an amine salt, such as the triethylamine mono-salt of maleic acid, may be added for the purpose of developing an acid on heating which serves to catalyze the insolubilization of the condensate during baking.

The compositions containing the thermosetting resin-forming condensates may be applied to any of the various substrates mentioned hereinafter, but they are particularly useful for forming tough finishes of thermoset character on metal surfaces, particularly on wire. The proportion of heat-reactive condensate may be from 2 to 40% by weight of the total weight of copolymer and condensate, but preferably is from 5 to 20% of such total weight.

The application of such mixed shellac-copolymer/thermosetting condensate compositions may be effected at total solids concentrations of 1 to 70%, but is preferably carried out at about 20 to 45% by weight concentrations. The application of the coating is followed by drying and a curing or baking at a temperature of 212° to 450° F. The time of curing may vary from a period ranging from one-half to three minutes at the upper temperature or higher, whereas the baking may be effected for about one-half hour at the lower temperature of the range just mentioned.

The copolymer-resin dispersions may be applied for coating or impregnating various substrates to produce a clear impregnant or coating within or on the substrate.

The aqueous dispersions or solutions of the present invention may be pigmented or fillers or delustrants may be introduced for special purposes. Examples of suitable pigments which may be included in an amount up to 100% by weight of the copolymer blend include titanium dioxide, carbon black, iron blues, phthalocyanine blues and greens; metal oxides, hydroxides, sulfides, sulfates, and silicates; organic maroons, aluminum flake, bronze powders, pearl essence, and various fillers or extenders such as talc, barytes, china clay, and diatomaceous earth. The proportion of such pigment or filler may be from about one-fiftieth of the weight of the copolymer to as much as 20 times the weight of copolymer depending upon the particular application desired.

The clear or pigmented copolymer dispersions or solutions may be applied to numerous other substrates including leather, wood, glass, masonry, such as brick, concrete block, cement, asbestos cement shingles and siding, ceramics, wall-covering and floor-covering materials, such as linoleum, vinyl tile, and felt-base materials. They are particularly characterized by outstanding adhesion to most of the aforementioned materials, and can be employed to form thermoplastic coatings thereon in which event baking although beneficial is not required.

In the following examples, which are illustrative of the invention, the parts and percentages are by weight unless otherwise indicated. In the examples, wherever reference is made to Minimum Film Formation Temperature (MFT), this represents the lowest temperature at which the polymer dispersion can be dried with formation during drying of a continuous film because of fusion or coalescence of the polymer particles therein. Wherever reference is made to Film Hardness, it is expressed as Knoop hardness units (KHN) and it is determined on baked coatings of 3 to 5 mil thickness on cold-rolled steel plates by the Knoop indentation test based on ASTM Method D1474-57T. Two solvent resistances are used as follows:

(1) *At room temperature.*—Steel plates carrying baked coatings of the emulsion polymer are immersed in a mixture of equal volumes of toluene and ethyl alcohol for a period of 24 hours under ambient temperature conditions of 25° C. Resistance of the coating to the action of solvents is measured in terms of percent loss in film hardness and/or visual observations of the appearance of the coating.

(2) *At elevated temperature.*—Same as 1, except the test condition consisted of a one-hour exposure to a boiling mixture of equal volumes of toluene and ethyl alcohol.

Wherever, in the following examples, reference is made to the following electrical tests, they represent determinations made on self-supporting films made by casting the composition to be tested on mercury at a temperature high enough to coalesce the polymer particles to form a continuous film followed by baking.

*Dielectric constant, power factor, loss factor.*—All three tests were based on ASTM test method D-150 and were conducted at one kilocycle.

*Dielectric strength.*—Tests were made in accordance with test method MIL-I-7798A, using specimens conditioned at 25° C. and 50% RH as well as specimens soaked in distilled water at 25° C. for a period of 24 hours.

*Significance of electrical tests.*—As pointed out in the ASTM test method D-150 for electrical insulation effect such as involved in many wire coating procedures, the values of dielectric constant, power factor and loss factor should be low. The values for dielectric strength are preferably high.

EXAMPLE 1

(a) Twelve parts ammonium laurate were dissolved in 1600 parts water and to this solution was added with stirring: 290.5 parts acrylonitrile, 124.5 parts ethyl acrylate, 6.23 parts isopropanol, 6.23 parts bromotrichloromethane, 0.14 part ferric ethylenediaminetetraacetate, 0.12 part $FeSO_4 \cdot 7H_2O$, 3.7 parts para-menthane hydroperoxide, and 1.0 part sodium formaldehyde sulfoxylate. A flow of nitrogen was maintained over the stirred mixture. The temperature was 23° C.; the polymerization exotherm caused the temperature to rise to 60° C. in 1½ hours. When this temperature was reached, a monomer emulsion consisting of 50 parts ammonium laurate, 575 parts water, 1158.5 parts acrylonitrile, 496.5 parts ethyl acrylate, 24.8 parts isopropanol, 24.8 parts bromotrichloromethane, 14.8 ml. para-menthanehydroperoxide, 0.58 part ferric ethylenediaminetetraacetate, 0.5 part $$FeSO_4 \cdot 7H_2O$$

was added over a period of two hours to the polymer emulsion which was kept at 55° to 65° C. During the gradual addition of the monomer emulsion, 4.0 parts sodium formaldehyde sulfoxylate dissolved in 76 parts water were also added to the polymer emulsion. One hour after these additions were complete, the emulsion was cooled to 30° C. Then, 100 parts by weight of the resulting emulsion copolymer dispersion were modified with 13.9 parts by weight of dimethylformamide to facilitate coalescence of the polymer particles into a continuous film during use.

(b) A stock solution of shellac was prepared by adding in order 31 grams triethylamine and 125 grams shellac to 344 ml. water heated to 80° C. and stirring to form a homogeneous solution. The pH of the solution was 9.8. Forty grams of the solution, 175 ml. water, 30 grams ethyl acrylate, and 70 grams of acrylonitrile were mixed under an atmosphere of nitrogen. To this dispersion was added at 25° C., 0.25 ml. cumene hydroperoxide, 0.25 gram tetraethylene pentamine, and 0.005 gram $FeSO_4 \cdot 7H_2O$. Polymerization started after a one-hour induction period and the temperature rose to a peak of 55° C. in three hours. During the polymerization, 0.5 ml. cumene hydroperoxide, 0.5 gram tetraethylene pentamine, and 0.01 gram $FeSO_4 \cdot 7H_2O$ were added. Then, 100 parts of the resulting dispersion were modified with 7.7 parts of dimethylformamide.

(c) 54 parts of a 23% aqueous solution of the ammonium salt of the half-amide of a 1:1 mole ratio copolymer of maleic anhydride and diisobutylene, 207 parts bone-dry bleached shellac, 25 parts concentrated $NH_4OH$ (28%), and 1200 parts water were mixed and heated to 60° C. When the shellac was dissolved, the solution was cooled to 15° C. To this solution were added with stirring: 248 parts acrylonitrile, 125 parts ethyl acrylate, 0.14 part ferric ethylenediaminetetraacetate, 0.12 part $FeSO_4 \cdot 7H_2O$, 3.7 parts p-menthane hydroperoxide, and 1.0 part sodium formaldehyde sulfoxylate. A nitrogen atmosphere was maintained. The polymerization exotherm caused the temperature to rise to 62° C. in ten minutes. When this temperature was reached, a mixture consisting of 216 parts of a 23% aqueous solution of the half-amide of a 1:1 mole ratio copolymer of maleic anhydride and diisobutylene, 830 parts water, 992 parts acrylonitrile, 495 parts ethyl acrylate, 0.58 part ferric ethylenediaminetetraacetate, 0.5 part $FeSO_4 \cdot 7H_2O$, and 14.8 ml. of para-menthane hydroperoxide was added over a period of 1½ hours to the polymer emulsion which was kept at 50° to 60° C. During the gradual addition of this mixture, 4.0 parts sodium formaldehyde sulfoxylate dissolved in 76 parts water were also added to the polymer emulsion. One hour after these additions were complete, the polymer emulsion was cooled to 30° C. Then, 100 parts by weight of the final emulsion copolymer dispersion were modified with 13.2 parts by weight of dimethylformamide to facilitate formation of continuous films.

(d) the emulsion copolymer dispersions described in parts (a), (b), and (c) of this example when applied to wires of copper, aluminum, and steel, and baked for 5 to 10 minutes at 320° C. exhibited excellent adhesion and water-resistance. Table A provides the results of tests for film hardness, adhesion, and solvent-resistance determined on films obtained by applying the polymer dispersion to cold-rolled steel plates to give uniform dry film thickness of 3 to 5 mils. These coatings were then baked for a period of 30 minutes at 150° C. prior to testing. Table B provides the results of electrical tests conducted on a self-supporting fused or coalesced film of the emulsion polymers of part (c) (about 15 mils thickness dry) cast on mercury at 25° C. After completion of drying, the self-supporting films were cured for 30 minutes at 150° C. prior to testing.

*Table A*

| Test | Example 1 | | |
|---|---|---|---|
| | (a) | (b) | (c) |
| MFT—° C | 21° C | 28° C | <20° C. |
| Film Hardness—KHN | 16 | 22.3 | 21. |
| Initial Adhesion to Steel | Very poor | Excellent | Excellent. |
| Adhesion After Room Temperature Solvent Test. | None | Very Good | Very Good. |

*Table B*

| Tests: | Example 1(c) |
|---|---|
| Dielectric constant | 16 |
| Power factor | 0.23 |
| Loss factor | 3.7 |
| Dielectric strength—dry _____ volts per mil | 160 |
| Dielectric strength—wet _____ do ____ | 124 |

EXAMPLE 2

100 parts by weight of the emulsion copolymer dispersion of Example 1(c) were modified with 13.2 parts by weight of dimethylformamide. To this blend, 14.5 parts by weight of a methoxymethyl melamine condensate, sold under a trade name of Aerotex M3, were added. Self-supporting films of about 15 mils thickness were prepared by casting the composition on mercury and coalescing the coating by drying it above its minimum film-formation temperature. The composition was also applied to plates of cold-rolled steel and on wires of copper, aluminum, and steel. The films and coated articles were then baked at 150° C. for 30 minutes. The results of tests on the films and coatings are listed in Table C.

EXAMPLE 3

100 parts by weight of the emulsion copolymer dispersion from Example 1(c) were modified with 13.2 parts by weight of dimethylformamide. To this mixture were added 7.1 parts by weight of a phenol formaldehyde condensate. Minimum film-formation temperature of the final composition was found to be <20° C. Self-supporting films of about 15 mils thickness were prepared by casting the composition on mercury and coalescing the coating by drying it above its minimum film-formation temperature. The composition was also applied to plates of cold-rolled steel and on wires of copper, aluminum, and steel. The films and coated articles were then baked at 150° C. for 30 minutes. The results of tests on the films and coatings are listed in Table C.

EXAMPLE 4

(a) A stock solution of shellac was prepared by adding to 708 ml. water heated to 65° C., 42 ml. concentrated $NH_4OH$ (28%) and 250 grams shellac and mixing to form a homogeneous solution. The pH of the solution was 8.8. Then, 40 grams of the shellac solution, 175 ml. water, 30 grams butyl acrylate, 65 grams acrylonitrile, and 5.0 grams methacrylamide were mixed under a stream of nitrogen. To this mixture at 25° C. was added 0.25 ml. cumene hydroperoxide, 0.25 gram tetraethylene pentamine, and 0.005 gram $FeSO_4 \cdot 7H_2O$. Polymerization was complete in one hour.

(b) 100 parts by weight of emulsion copolymer dispersion from part (a) hereof were modified with 7.8 parts by weight of dimethylformamide. Minimum film-formation temperature of the final composition was found to be 21° C. Self-supporting films of about 15 mils thickness were prepared by casting the composition on mercury and coalescing the coating by drying it above its minimum film-formation temperature. The composition was also applied to plates of cold-rolled steel and on wires of copper, aluminum, and steel. The films and coated articles were then baked at 150° C. for 30 minutes. The results of tests on the films and coatings are listed in Table C.

EXAMPLE 5

(a) A stock solution of shellac was prepared by adding in order 31 grams triethylamine and 125 grams shellac to 344 ml. water heated to 80° C. and stirring to form a homogeneous solution. The pH of the solution was 9.8. Forty grams of the solution, 175 ml. water, 30 grams ethyl acrylate, 65 grams acrylonitrile, and 5.0 grams methacrylamide were mixed under nitrogen. To this dispersion was added at 25° C., 0.25 ml. cumene hydroperoxide, 0.25 gram tetraethylene pentamine, and 0.005 gram $FeSO_4 \cdot 7H_2O$. Polymerization started after an one-hour induction period and the temperature rose to a peak of 55° C. in three hours. During the polymerization, 0.5 ml. cumene hydroperoxide, 0.5 gram tetraethylene pentamine, and 0.01 gram FeSO$_4$·7H$_2$O were added.

(b) 100 parts by weight of emulsion copolymer dispersion from part (a) were modified with 7.7 parts by weight of dimethylformamide. Minimum film-formation temperature of the composition was found to be 23° C. Self-supporting films of about 15 mils thickness were prepared by casting the composition on mercury and coalescing the coating by drying it above its minimum film-formation temperature. The composition was also applied to plates of cold-rolled steel and on wires of copper, aluminum, and steel. The films and coated articles were then baked at 150° C. for 30 minutes. The results of tests on the films and coatings are listed in Table C.

EXAMPLE 6

100 parts by weight of emulsion copolymer dispersion from Example 5(b) above were blended with 7.9 parts by weight of a methoxymethyl melamine condensate sold under the trade name of Aerotex M3. Self-supporting films of about 15 mils thickness were prepared by casting the composition on mercury and coalescing the coating by drying it above its minimum film-formation temperature. The composition was also applied to plates of cold-rolled steel and on wires of copper, aluminum, and steel. The films and coated articles were then baked at 150° C. for 30 minutes. The results of tests on the films and coatings are listed in Table C.

applied to plates of cold-rolled steel and on wires of copper, aluminum, and steel. The films and coated articles were then baked at 150° C. for 30 minutes. Solvent tests, both at room and elevated temperatures, showed the coating to possess a high degree of adhesion initially and at the conclusion of the solvent test. Electrical tests conducted on fuse films gave results which are listed in Table D.

Table D

| Tests | Example | |
|---|---|---|
| | 7 | 8 |
| Dielectric Constant | 15.0 | 6.6 |
| Power Factor | 0.30 | .06 |
| Loss Factor | 4.5 | 4.0 |
| Dielectric Strength—Dry v./mil | 175 | 434 |
| Dielectric Strength—Wet v./mil | 105 | |

EXAMPLE 9

(a) The procedure of Example 5(a) was repeated replacing the ethyl acrylate with methyl acrylate.

(b) 100 parts by weight of emulsion copolymer dispersion from part (a) hereof were blended with 7.7 parts by weight of dimethylformamide. To this mixture were added 7.9 parts by weight of methoxymethyl melamine condensate, sold under a trade name of Aerotex M3. Cold-rolled steel coated with this modified emulsion showed the polymer system to have good solvent resistance at both room and elevated temperatures.

Table C

| Tests | Example | | | | | Commercial Wire Enamel Emulsion |
|---|---|---|---|---|---|---|
| | 2 | 3 | 4 | 5 | 6 | |
| Film Hardness—KHN | 25.6 | 22.5 | 21.1 | 22.6 | Excellent | Excellent. |
| Initial Adhesion | Excellent | Excellent | Excellent | Excellent | 35% | 67%. |
| R.T. Solvent Test [1] | 32% | 68% | 65% | | 34% | 61%. |
| Boiling Solvent Test [1] | 65% | 76% | 76% | | | |
| Adhesion After R.T. Solvent Test | Very Good | Excellent | Very Good | Very Good | Very Good | Very Good. |
| Dielectric Constant | 6.3 | 8.3 | 16.0 | 9.3 | 1.4 | 10.0. |
| Power Factor | 0.16 | 0.20 | 0.30 | 0.15 | 0.02 | 0.22. |
| Loss Factor | 1.0 | 1.7 | 4.8 | 1.4 | 0.03 | 2.2. |
| Dielectric Strength—Dry, v./mil | 386 | 278 | 196 | 290 | 450 | 223. |
| Dielectric Strength—Wet, v./mil | 219 | | 242 | 230 | <84 | <79. |

[1] Values represent percent of initial film hardness (KHN) lost as a result of the solvent test.

EXAMPLE 7

(a) The procedure of Example 4(a) was repeated replacing the butyl acrylate with ethyl acrylate.

(b) 100 parts by weight of the emulsion copolymer dispersion from part (a) hereof were blended with 6.4 parts by weight of dimethylformamide. Self-supporting films of about 15 mils thickness were prepared by casting the composition on mercury and coalescing the coating by drying it above its minimum film-formation temperature. The composition was also applied to plates of cold-rolled steel and on wires of copper, aluminum, and steel. The films and coated articles were then baked at 150° C. for 30 minutes. Solvent tests, both at room and elevated temperatures, showed the coating to possess excellent initial and final adhesion characteristics. Electrical tests conducted on films gave results which are listed in Table D.

EXAMPLE 8

(a) 100 parts by weight of the emulsion copolymer dispersion from Example 7(a) above were blended with 7.1 parts by weight of dimethylformamide. To this blend were added 7.1 parts by weight of a methoxymethyl melamine condensate, sold under a trade name of Aerotex M3. Self-supporting films of about 15 mils. thickness were prepared by casting the composition on mercury and coalescing the coating by drying it above its minimum film-formation temperature. The composition was also

EXAMPLE 10

(a) A copolymer dispersion was prepared as in Example 5 except that the amount of shellac solution was reduced from 40 grams to 20 grams.

(b) 100 parts by weight of emulsion copolymer dispersion from part (a) hereof were blended with 7.7 parts by weight of dimethylformamide. To this mixture were added 7.9 parts by weight of methoxymethyl melamine condensate, sold under a trade name of Aerotex M3. The coating applied to cold-rolled steel and baked at 150° C. for 30 minutes showed excellent adhesion and good solvent resistance.

It is to be understood that changes and variations may be made without departing from the spirit and scope of the invention as defined in the appended claims.

We claim:

1. As an article of manufacture, a solid substrate having a coating thereon of a coalesced product of polymerization obtained by subjecting acrylonitrile and an ester of acrylic acid with an alkanol having 1 to 4 carbon atoms to polymerization conditions while dispersed in an aqueous solution of shellac containing a peroxy free-radical initiator, the proportions of acrylonitrile, ester, and shellac being 50 to 80%, 15 to 45%, and 5 to 15% by weight respectively based on the total weight of acrylonitrile, ester, and shellac.

2. An article as defined in claim 1 in which the substrate is a metal.

3. An article as defined in claim 1 in which the substrate is a wire.

4. As an article of manufacture, a solid substrate having a coating thereon of a coalesced product of polymerization obtained by subjecting acrylonitrile and ethyl acrylate to polymerization conditions while dispersed in an aqueous alkaline solution of shellac containing a peroxy free-radical initiator, the proportions of acrylonitrile, ethyl acrylate, and shellac being 50 to 80%, 15 to 45%, and 5 to 15% by weight respectively based on the total weight of acrylonitrile, ethyl acrylate, and shellac.

5. As an article of manufacture, a solid substrate having a coating thereon of a coalesced product of polymerization obtained by subjecting acrylonitrile and butyl acrylate to polymerization conditions while dispersed in an aqueous alkaline solution of shellac containing a peroxy free-radical initiator, the proportions of acrylonitrile, butyl acrylate, and shellac being 50 to 80%, 15 to 45%, and 5 to 15% by weight respectively based on the total weight of acrylonitrile, butyl acrylate, and shellac.

6. As an article of manufacture, a solid substrate having a coating thereon of a coalesced product of polymerization obtained by subjecting acrylonitrile and methyl acrylate to polymerization conditions while dispersed in an aqueous alkaline solution of shellac containing a peroxy free-radical initiator, the proportions of acrylonitrile, methyl acrylate, and shellac being 50 to 80%, 15 to 45%, and 5 to 15% by weight respectively based on the total weight of acrylonitrile, methyl acrylate, and shellac.

7. As an article of manufacture, a solid substrate having a coating thereon of a heat-cured mixture of (A) a product of polymerization obtained by subjecting acrylonitrile and an ester of acrylic acid with an alkanol having 1 to 4 carbon atoms to polymerization conditions while dispersed in an aqueous alkaline solution of shellac containing a peroxy free-radical initiator, the proportions of acrylonitrile, ester, and shellac being 50 to 80%, 15 to 45%, and 5 to 15% by weight respectively based on the total weight of acrylonitrile, ester, and shellac, and (B) a water-dispersible condensation product of formaldehyde with at least one member selected from the group consisting of urea, thiourea, phenol and melamine, the proportion of (B) being from 2 to 40% by weight of the total of (A) and (B).

8. An article as defined in claim 7 in which the substrate is a metal.

9. An article as defined in claim 7 in which the substrate is a metal wire.

10. A composition comprising a product of polymerization obtained by subjecting acrylonitrile and an ester of acrylic acid with an alkanol having 1 to 4 carbon atoms to polymerization conditions while dispersed in an aqueous alkaline solution of shellac containing a peroxy free-radical initiator, the proportions of acrylonitrile, ester, and shellac being 50 to 80%, 15 to 45%, and 5 to 15% by weight respectively based on the total weight of acrylonitrile, ester, and shellac.

11. A composition comprising water and dispersed therein a water-insoluble product of polymerization obtained by subjecting acrylonitrile and an ester of acrylic acid with an alkanol having 1 to 4 carbon atoms to polymerization conditions while dispersed in an aqueous alkaline solution of shellac containing a peroxy free-radical initiator, the proportions of acrylonitrile, ester, and shellac being 50 to 80%, 15 to 45%, and 5 to 15% by weight respectively based on the total weight of acrylonitrile, ester, and shellac.

12. A composition comprising (A) a product of polymerization obtained by subjecting acrylonitrile and an ester of acrylic acid with an alkanol having 1 to 4 carbon atoms to polymerization conditions while dispersed in an aqueous alkaline solution of shellac containing a peroxy free-radical initiator, the proportions of acrylonitrile, ester, and shellac being 50 to 80%, 15 to 45%, and 5 to 15% by weight respectively based on the total weight of acrylonitrile, ester, and shellac, and (B) a water-dispersible condensation product of formaldehyde with at least one member selected from the group consisting of urea, thiourea, phenol, and melamine, the proportion of (B) being from 2 to 40% by weight of the total of (A) and (B).

13. A composition comprising (A) a product of polymerization obtained by subjecting acrylonitrile and ethyl acrylate to polymerization conditions while dispersed in an aqueous alkaline solution of shellac containing a peroxy free-radical initiator, the proportions of acrylonitrile, ethyl acrylate, and shellac being 50 to 80%, 15 to 45%, and 5 to 15% by weight respectively based on the total weight of acrylonitrile, ethyl acrylate, and shellac, and (B) a water-dispersible condensation product of formaldehyde with at least one member selected from the group consisting of urea, thiourea, phenol, and melamine, the proportion of (B) being from 2 to 40% by weight of the total of (A) and (B).

14. A composition comprising (A) a product of polymerization obtained by subjecting acrylonitrile and butyl acrylate to polymerization conditions while dispersed in an aqueous alkaline solution of shellac containing a peroxy free-radical initiator, the proportions of acrylonitrile, butyl acrylate, and shellac being 50 to 80%, 15 to 45%, and 5 to 15% by weight respectively based on the total weight of acrylonitrile, butyl acrylate, and shellac, and (B) a water-dispersible condensation product of formaldehyde with at least one member selected from the group consisting of urea, thiourea, phenol, and melamine, the proportion of (B) being from 2 to 40% by weight of the total of (A) and (B).

15. A composition comprising (A) a product of polymerization obtained by subjecting acrylonitrile and methyl acrylate to polymerization conditions while dispersed in an aqueous alkaline solution of shellac containing a peroxy free-radical initiator, the proportions of acrylonitrile, methyl acrylate, and shellac being 50 to 80%, 15 to 45%, and 5 to 15% by weight respectively based on the total weight of acrylonitrile, methyl acrylate, and shellac, and (B) a water-dispersible condensation product of formaldehyde with at least one member selected from the group consisting of urea, thiourea, phenol, and melamine, the proportion of (B) being from 2 to 40% by weight of the total of (A) and (B).

16. A composition comprising an aqueous dispersion, substantially free of inorganic salts, of (A) a product of polymerization obtained by subjecting acrylonitrile and an ester of acrylic acid with an alkanol having 1 to 4 carbon atoms to polymerization conditions while dispersed in an aqueous alkaline solution of shellac containing a peroxy free-radical initiator, the proportions of acrylonitrile, ester, and shellac being 50 to 80%, 15 to 45%, and 5 to 15% by weight respectively based on the total weight of acrylonitrile, ester, and shellac, and (B) a water-dispersible condensation product of formaldehyde with at least one member selected from the group consisting of urea, thiourea, phenol, and melamine, the proportion of (B) being from 2 to 40% by weight of the total of (A) and (B).

17. A heat-cured coating composition comprising (A) a product of polymerization obtained by subjecting acrylonitrile and an ester of acrylic acid with an alkanol having 1 to 4 carbon atoms to polymerization conditions while dispersed in an aqueous alkaline solution of shellac containing a peroxy free-radical initiator, the proportions of acrylonitrile, ester, and shellac being 50 to 80%, 15 to 45%, and 5 to 15% by weight respectively based on the total weight of acrylonitrile, ester, and shellac, and (B) a water-dispersible condensation product of formaldehyde with at least one member selected from the group consisting of urea, thiourea, phenol, and melamine, the proportion of (B) being from 2 to 40% by weight of the total of (A) and (B).

18. A process of coating a solid substrate comprising applying the composition of claim 12 to the substrate and heating to coalesce and cure the coating composition on the substrate.

19. A process of coating wire comprising applying the composition of claim 12 to a wire and heating to coalesce and cure the coating composition on the wire.

20. As an article of manufacture, a solid substrate having a coating thereon of a coalesced product of polymerization obtained by subjecting acrylonitrile, an ester of acrylic acid with an alkanol having 1 to 4 carbon atoms, and an olefinically unsaturated reactive monomer having a group selected from the group consisting of amide, carboxylate salt, amine, and ureido groups to polymerization conditions while dispersed in an aqueous alkaline solution of shellac containing a peroxy free-radical initiator, the proportions of acrylonitrile, ester, reactive monomer, and shellac being 50 to 80%, 15 to 45%, up to 10%, and 5 to 15% by weight respectively based on the total weight of acrylonitrile, ester, reactive monomer, and shellac.

21. A composition comprising a prouct of polymerization obtained by subjecting acrylonitrile, an ester of acrylic acid with an alkanol having 1 to 4 carbon atoms, and an olefinically unsaturated reactive monomer having a group selected from the group consisting of amide, carboxylate salt, amine, and ureido groups to polymerization conditions while dispersed in an aqueous alkaline solution of shellac containing a peroxy free-radical initiator, the proportions of arcylonitrile, ester, reactive monomer, and shellac being 50 to 80%, 15 to 45%, up to 10%, and 5 to 15% by weight respectively based on the total weight of acrylonitrile, ester, reactive monomer, and shellac.

22. A composition comprising water and dispersed therein a water-insoluble product of polymerization obtained by subjecting acrylonitrile, an ester of acrylic acid with an alkanol having 1 to 4 carbon atoms, and an olefinically unsaturated reactive monomer having a group selected from the group consisting of amide, carboxylate salt, amine, and ureido groups to polymerization conditions while dispersed in an aqueous alkaline solution of shellac containing a peroxy free-radical initiator, the proportions of acrylonitrile, ester, reactive monomer, and shellac being 50 to 80%, 15 to 45%, up to 10%, and 5 to 15% by weight respectively based on the total weight of acrylonitrile, ester, reactive monomer, and shellac.

23. A composition comprising (A) a product of polymerization obtained by subjecting acrylonitrile, an ester of acrylic acid with an alkanol having 1 to 4 carbon atoms, and an olefinically unsaturated reactive monomer having a group selected from the group consisting of amide, carboxylate salt, amine, and ureido groups to polymerization conditions while dispersed in an aqueous alkaline solution of shellac containing a peroxy free-radical initiator, the proportions of acrylonitrile, ester, reactive monomer, and shellac being 50 to 80%, 15 to 45%, up to 10%, and 5 to 15% by weight respectively based on the total weight of acrylonitrile, ester, reactive monomer, and shellac, and (B) a water-dispersible condensation product of formaldehyde with at least one member selected from the group consisting of urea, thiourea, phenol, and melamine, the proportion of (B) being from 2 to 40% by weight of the total of (A) and (B).

References Cited in the file of this patent

UNITED STATES PATENTS

| | | |
|---|---|---|
| 2,275,198 | Patnode et al. | Mar. 3, 1942 |
| 2,529,712 | Teague | Nov. 14, 1950 |
| 2,576,075 | Naps | Nov. 20, 1951 |
| 2,579,008 | Naps | Dec. 18, 1951 |
| 2,715,616 | MacIntosh | Aug. 16, 1955 |